(12) United States Patent
Matican et al.

(10) Patent No.: US 10,749,951 B2
(45) Date of Patent: Aug. 18, 2020

(54) SELECTION OF LEADER NODES IN DISTRIBUTED DATA SERVICES

(71) Applicant: YugaByte Inc, Sunnyvale, CA (US)

(72) Inventors: Bogdan-Alexandru Matican, Sunnyvale, CA (US); Rahul Desirazu, Sunnyvale, CA (US); Karthik Ranganathan, Sunnyvale, CA (US); Kannan Muthukkaruppan, Sunnyvale, CA (US); Bharat Chandra Baddepudi, Sunnyvale, CA (US); Ramkumar Vaidyanathan Sri, Sunnyvale, CA (US); Choudhury Sidharth, Sunnyvale, CA (US)

(73) Assignee: YugaByte Inc, Sunnyvale, CA (US)

( * ) Notice: Subject to any disclaimer, the term of this patent is extended or adjusted under 35 U.S.C. 154(b) by 0 days.

(21) Appl. No.: 16/398,281

(22) Filed: Apr. 30, 2019

(65) Prior Publication Data
US 2019/0342383 A1    Nov. 7, 2019

Related U.S. Application Data

(60) Provisional application No. 62/665,496, filed on May 1, 2018, provisional application No. 62/690,344, filed on Jun. 26, 2018.

(51) Int. Cl.
| | |
|---|---|
| *H04L 29/08* | (2006.01) |
| *H04L 29/12* | (2006.01) |
| *G06F 9/50* | (2006.01) |
| *H04L 12/24* | (2006.01) |
| *G06F 16/27* | (2019.01) |

(52) U.S. Cl.
CPC ........ *H04L 67/1051* (2013.01); *G06F 9/5077* (2013.01); *G06F 16/27* (2019.01); *H04L 41/0806* (2013.01); *H04L 41/0893* (2013.01); *H04L 41/22* (2013.01); *H04L 61/1511* (2013.01); *H04L 67/10* (2013.01);
(Continued)

(58) Field of Classification Search
CPC ............ H04L 41/0806; H04L 41/0813; H04L 41/0893; H04L 41/30; H04L 6/10; H04L 67/10978; H04L 67/10; H04L 67/1097; H04L 67/1051; H04L 67/34; G06F 9/45553; G06F 9/45558; G06F 9/5072; G06F 9/5077
See application file for complete search history.

(56) References Cited

U.S. PATENT DOCUMENTS

| | | | | |
|---|---|---|---|---|
| 2005/0132030 A1* | 6/2005 | Hopen | ................ | H04L 67/1008 709/223 |
| 2013/0024559 A1* | 1/2013 | Susanta | ................ | G06F 9/5061 709/224 |

(Continued)

*Primary Examiner* — Aaron N Strange
(74) *Attorney, Agent, or Firm* — Iphorizons PLLC; Narendra Reddy Thappeta

(57) ABSTRACT

An aspect of the present disclosure facilitates selection of leader nodes in distributed data services. In one embodiment, a distributed data service is provided operative based on multiple nodes. Upon receiving from a user a selection of a set of nodes that are preferred as leader nodes, a node contained in the set of nodes is set as a leader node in the distributed data service in view of the selection by the user. Accordingly, a user is provided control over the selection of leader nodes in the distributed data service.

17 Claims, 13 Drawing Sheets

(52) U.S. Cl.
CPC .......... *H04L 67/1097* (2013.01); *H04L 67/32* (2013.01); *H04L 67/34* (2013.01)

(56) References Cited

U.S. PATENT DOCUMENTS

| | | | |
|---|---|---|---|
| 2018/0183656 A1* | 6/2018 | Jones | H04W 84/20 |
| 2019/0036765 A1* | 1/2019 | Ghosal | G06F 11/2005 |
| 2019/0235946 A1* | 8/2019 | Guo | G06F 11/2023 |
| 2019/0238634 A1* | 8/2019 | Mohanta | H04L 43/0876 |
| 2020/0026625 A1* | 1/2020 | Konka | H04L 41/0893 |

* cited by examiner

Create Universe  1. Primary Cluster  2. Read Replica

— 430

🧑 demo@yugabyte.com ▾

Cloud Configuration  440

Reset config

| Name | xdc-read-replicas |
| Provider | X GCP-config |
| Regions | X GCP-Oregon |
| Nodes | 3   Replication Factor  1  3  5  7 |

Availability Zones

| Name | Nodes | Preferred |
|---|---|---|
| gcp-us-west1-a | 1 | ☒ |
| gcp-us-west1-b | 1 | ☒ |
| aws-us-west1-c | 1 | ☒ |

✓ Primary data placement is geo-redundant, universe can survive at least 1 availability zone failure  450

Instance Configuration

Instance Type: n-standard-1

Use Spot Pricing ⊗  Spot pricing suitable for test environments only, because spot instance might go away any Volume Info  2  X  250     EBS Type  GP2 ⇅   455

Assign Public IP ◯  Whether or not to assign a public IP.

Advanced

...

490     465

Cancel     Create     Configure Read Replica     460

FIG. 4B

Create Universe  1. Primary Cluster  2. Read Replica

👤 demo@yugabyte.com ▾

500

Cloud Configuration

Reset config

| | | | | | |
|---|---|---|---|---|---|
| Name | xdc-read-replicas | | | | |
| Provider | X GCP-config ▾ | | | | |
| Regions | X GCP-Oregon | X ▾ | | | |
| Nodes | 3 | Replication Factor | 1 | 5 | 7 |

Availability Zones

| Name | Nodes | Preferred |
|---|---|---|
| gcp-us-west1-a | 1 | ☐ |
| gcp-us-west1-b | 2 | ☒ |

540

⚠ Primary data placement is not geo-redundant, universe cannot survive even 1 availability zone failure

Instance Configuration

Instance Type  n-standard-1 ▾

Use Spot Pricing  ⊗  Spot pricing suitable for test environments only, because spot instance might go away any Volume Info  2  X  250    EBS Type  GP2 ▾

Assign Public IP  ✓  Whether or not to assign a public IP.

Advanced

. . .

( Cancel )   ( Create )   ( Configure Read Replica )

| NAME | CLOUD | REGION | ZONE | MASTER | TSERVER | PRIVATE IP | STATUS | ACTION |
|---|---|---|---|---|---|---|---|---|
| Yb-15-xdc-read-replicas-n5 | gcp | us-west1 | us-west1-a | Details | Details | 10.150.0.36 | Live | ACTIONS |
| Yb-15-xdc-read-replicas-n4 | gcp | us-west1 | us-west1-c | Details (Leader) | Details | 10.150.0.42 | Live | ACTIONS |
| Yb-15-xdc-read-replicas-n6 | gcp | us-west1 | us-west1-b | Details | Details | 10.150.0.37 | Live | ACTIONS |

Read Replicas

| NAME | CLOUD | REGION | ZONE | MASTER | TSERVER | PRIVATE IP | STATUS | ACTION |
|---|---|---|---|---|---|---|---|---|
| Yb-15-xdc-read-replicas-n2 | aws | us-east-1 | us-east-1b | - | Details | 172.152.40.119 | Live | ACTIONS |
| Yb-15-xdc-read-replicas-n3 | aws | us-east-1 | us-east-1f | - | Details | 172.152.107.99 | Live | ACTIONS |
| Yb-15-xdc-read-replicas-n1 | aws | us-east-1 | us-east-1e | - | Details | 172.152.82.148 | Live | ACTIONS |

SELECTION OF LEADER NODES IN DISTRIBUTED DATA SERVICES

PRIORITY CLAIM

The present disclosure claims priority to U.S. Provisional Patent Application No. 62/665,496, filed May 1, 2018, entitled "ORCHESTRATION OF DISTRIBUTED DATABASES SPANNING DIVERSE CLOUD INFRASTRUCTURES," and U.S. Provisional Patent Application No. 62/690,344, filed Jun. 26, 2018, entitled "ORCHESTRATION OF DISTRIBUTED DATABASES SPANNING DIVERSE CLOUD INFRASTRUCTURES," both of which are incorporated herein by reference in their entireties.

RELATED APPLICATIONS

The present application is related to the following applications, which are both incorporated in their entirety into the present application:

1. Entitled, "ORCHESTRATION OF DATA SERVICES IN MULTIPLE CLOUD INFRASTRUCTURES", Ser. No. 16/398.279, Filed on even date herewith, naming as inventors Bharat Chandra Baddepudi, et al.

2. Entitled, "CONSUMPTION OF DATA SERVICES PROVISIONED IN CLOUD INFRASTRUCTURES", Ser. No. 16/398,283, Filed on even date herewith, naming as inventors Mihnea-Marian Iancu, et al.

BACKGROUND OF THE DISCLOSURE

Technical Field

The present disclosure relates to cloud computing and more specifically to selection of leader nodes in distributed data services.

Related Art

Data services refer to implementations designed to provide access (storage and retrieval) to data using data storages. Examples of such data services include databases and file systems. External applications may access desired data elements by interacting with data services according to pre-specified conventions. Data services are referred to as 'data as a service' (DaaS) in several environments.

Distributed data services refer to implementations which are based on a collection of processing nodes and data storage nodes, often as nodes of a cloud infrastructure. The collection of all such nodes (hereafter referred to as "universe") cooperatively provide a unified view of data service interfaces with external applications, while shielding the applications from the underlying storage and processing of data. Distributed data services thus provide for distributed features such as fault tolerance (of nodes or storage), enhanced performance, data redundancy (by a replication factor), etc., as is well known in the relevant arts.

Leader nodes are inherent to the operation of distributed data services. Leader nodes generally provide central essential tasks that would be required as distributed data services are implemented based on various nodes. For example, a large scale distributed data service may be designed as several cooperating parts, with each part being replicated (distributed) in each node of a group of nodes (hereinafter referred to as "a cluster of nodes" implementing each part) and a leader node in the cluster providing a central essential task for that cluster. One of such central essential tasks is to operate as a point of interface to the external applications for using the service corresponding to the part, which is desirable as the part is replicated among the cluster of nodes. Different processing nodes of a cluster may operate as leader nodes in corresponding durations, while some of the nodes operating as leader nodes for some parts may operate as followers for other parts.

Aspects of the present disclosure relate to selection of leader nodes in distributed data services.

BRIEF DESCRIPTION OF THE DRAWINGS

Example embodiments of the present disclosure will be described with reference to the accompanying drawings briefly described below.

FIGS. 4A and 4B depicts sample user interfaces provided for provisioning/creation of a distributed database (example distributed data service) in one embodiment.

FIGS. 5A-5B depict sample user interfaces provided for specifying customer preference data indicating the preferred regions/zones for leader nodes during creation of distributed databases (example distributed data services) in one embodiment.

FIGS. 6A-6C depicts sample user interfaces provided for monitoring the operation of a provisioned distributed database (example distributed data service) in one embodiment.

DETAILED DESCRIPTION OF THE EMBODIMENTS OF THE DISCLOSURE

1. Overview

Figure 1:
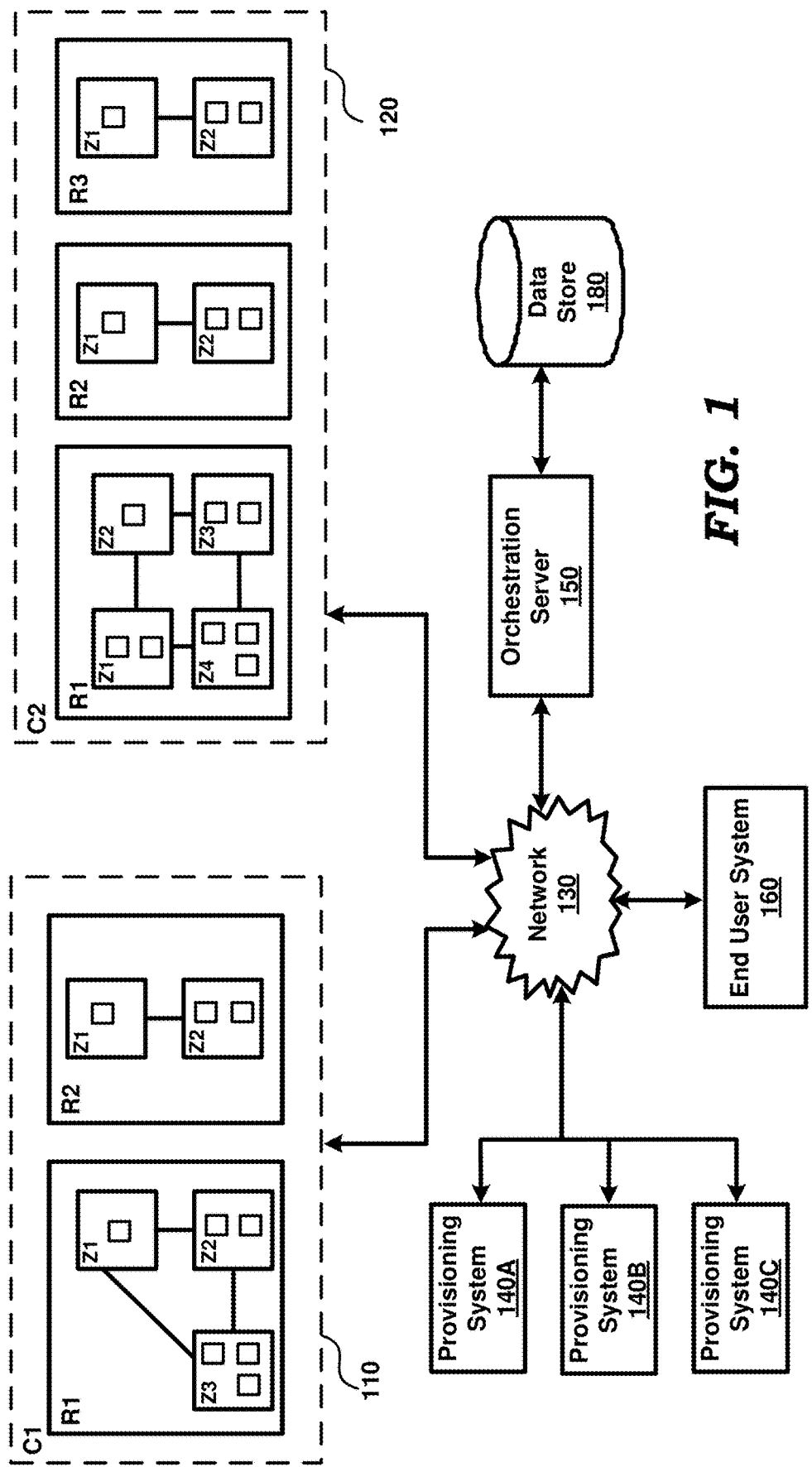
FIG. 1 is a block diagram illustrating an example environment in which several aspects of the present disclosure can be implemented.

An aspect of the present disclosure facilitates selection of leader nodes in distributed data services. In one embodiment, a distributed data service is provided operative based on multiple nodes. Upon receiving from a user a selection of a set of nodes that are preferred as leader nodes, a node contained in the set of nodes is set as a leader node in the distributed data service in view of the selection by the user. Accordingly, a user is provided control over the selection of leader nodes in the distributed data service.

According to another aspect of the present disclosure, an input data requesting provisioning of the distributed data service is received from the user. The selection of the nodes that are preferred as leader nodes is received as part of the input data. In response to receiving the input data, orchestration of the provisioning of the distributed data service on the multiple nodes is performed. The setting of the leader nodes from the preferred set of nodes is performed as part of the orchestration. Thus, a user is facilitated to provision the distributed data service and to also select the preferred leader nodes as part of such provisioning.

According to one more aspect of the present disclosure, the nodes based on which a distributed data service is operative are nodes of a cloud infrastructure, in which the nodes are organized into multiple zones. As such, the selection of the set of nodes (noted above) is performed by indicating a preferred zone among the multiple zones, wherein the set of nodes are organized into the preferred zone.

According to yet another aspect of the present disclosure, the nodes based on which a distributed data service is operative are grouped into multiple clusters, with a corresponding leader node for each cluster being elected. However, if the elected leader node of a cluster is not organized into the preferred zone (specified by a user), one of the preferred set of nodes (specified by the user) is set as the leader node of the cluster.

In one embodiment, the electing of the leader nodes is performed by a consensus algorithm (such as Raft consensus algorithm), with the setting of user preferred leader node for a cluster being performed by execution of the consensus algorithm iteratively until one of the preferred set of nodes (specified by the user) organized into the preferred zone (specified by the user) is elected as the leader node of the cluster.

According to an aspect of the present disclosure, the distributed data service is a distributed database.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present disclosure can be implemented. The block diagram is shown containing cloud infrastructures 110 and 120, network 130, provisioning systems 140A-140C, orchestration server 150, end user system 160 and data store 180.

Merely for illustration, only representative number/type of blocks is shown in the FIG. 1. Many environments often contain many more blocks, both in number and type, depending on the purpose for which the environment is designed. Each block of FIG. 1 is described below in further detail.

Each of cloud infrastructures 110 and 120 refers to a collection of processing nodes, connectivity infrastructure, data storages, etc., which are engineered to together provide a virtual computing infrastructure for various customers, with the scale of such computing infrastructure being specified often on demand. The nodes can be virtual nodes (e.g., virtual machines (VMs), containers containing one or more VMs) operating based on physical nodes, physical nodes themselves, or a combination as well.

It may be appreciated that the cloud infrastructures typically span several continents and are provided by different vendors. In addition, each cloud infrastructure may vary substantially from another in terms of interface requirements, scale, technical characters of nodes, hardware/software/network implementation, etc., and thus the cloud infrastructures are said to be diverse. Examples of such diverse cloud infrastructures include, but are not limited to, public clouds such as Amazon Web Services (AWS) Cloud available from Amazon.com, Inc., Google Cloud Platform (GCP) available from Google LLC, Kubernetes etc., and private clouds such as On-Premises clouds owned by the customers.

Cloud infrastructure (C1) 110 is shown containing nodes (processing or storage, shown as squares) located in two different geographical regions R1 and R2. Each region is shown containing multiple availability zones (named as Z1, Z2, etc.), each having independent support infrastructure such as power, networking, etc. Each availability zone (e.g., C1-R1-Z1) can thus operate independent of other zones, such that the availability zone can continue to operate even upon the failure of the other zones (e.g., C1-R1-Z2 and C1-R1-Z3). Cloud infrastructure (C2) 120 is similarly shown with regions R1, R3, R4 with respective regional sets of availability zones, with each availability zone containing respective nodes.

Network 130 represents a network providing connectivity between cloud infrastructures 110 and 120, provisioning systems 140A-140C, orchestration server 150 and end user system 160. Network 110 may be an internetwork (including the world-wide connected Internet), an intranet, a combination of internetwork and intranet, etc. Network 110 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by network 110. When the packet contains content such as port numbers, which specifies a target application, the packet may be said to be directed to such application as well.

Each of the provisioning systems 140A-140C is designed to control configuration of nodes within a corresponding cloud infrastructure. Thus, provisioning systems 140A and 140B may respectively be for controlling cloud infrastructures 110 and 120, and be provided by vendors of the respective cloud infrastructures. Provisioning system 140C represents a similar system, but provided by third party vendors (who do not provide the cloud infrastructure themselves). Thus provisioning system 140C may communicate directly with the corresponding cloud infrastructure (say 120) or interface with the vendor provided provisioning system (140B) to cause the corresponding configuration. Communication directly implies that the corresponding instruction is encoded in IP packets directed to (the nodes of) the cloud infrastructure. Examples of third party provisioning systems include, but are not limited to, Ansible available from Red Hat Inc, TerraForm available from HashiCorp, Inc, etc.

Data store 180 represents a non-volatile (persistent) storage facilitating storage and retrieval of data (details of nodes, orchestration, etc.) by applications executing in orchestration server 150. Data store 180 may be implemented as a corresponding database server using relational database technologies and accordingly provide storage and retrieval of data using structured queries such as SQL (Structured Query Language). Alternatively, data store 180 may be implemented as a corresponding file server providing storage and retrieval of data in the form of files organized as one or more directories, as is well known in the relevant arts.

End user system 160 represents a system such as a personal computer, workstation, mobile device, computing tablet etc., used by users/customers to generate (user) requests directed to applications executing in orchestration server 150. The user requests may be generated using appropriate user interfaces (e.g., web pages provided by an application executing in the server, a native user interface provided by a portion of an application downloaded from the server, etc.). In general, end user system requests an application for performing desired tasks and receives the corresponding responses (e.g., web pages) containing the results of performance of the requested tasks. The web pages/responses may then be presented to the user/customer at end user system 160 by client applications such as the browser.

Orchestration server 150 represents a server system, such as a web/application server, executing applications designed to perform tasks requested by users/customers using end user system 160. Specifically, orchestration server 150 facilitates users/customers to perform orchestration of distributed data services in multiple cloud infrastructures (such as 110 and 120).

Orchestration of a distributed data service entails creation or formation of the universe of nodes for hosting the distributed data service, any preparatory steps thereto (checking node availability, etc.), configuration of the nodes in the universe to provide the distributed data service, and/or subsequent administrative tasks.

Examples of such administrative tasks include but are not limited to setting the leader nodes for the distributed data service, choosing the set of regions/zones that host the data service, expanding/shrinking the size of the universe, replacing nodes of the universe on demand (i.e., migrating application/data to another node), increasing replication factor, taking backups, restoring from a backup, changing the node type/software components installed in a node, upgrading/downgrading the distributed data service implementation, etc.

As noted in the Background, a large-scale distributed data service is commonly designed as several cooperating parts, with a cluster of nodes implementing each part and a leader node in the cluster providing central essential tasks for that cluster. In one embodiment, a leader node is selected to operate as a point of interface to external applications (executing outside the cluster) for using the service corresponding to the part. Upon receiving a write request for storing a data item, the leader node decides the order in which the data item is to be committed, with the other nodes in the cluster using the same order to commit the write of the received data item. As such, write requests are required to always be routed through the leader node. For read requests for retrieving data items, the leader node provides the latest values for the requested data items as is needed for a strong consistent data service, while the other nodes in the cluster provide potentially older, though timeline consistent, values.

Thus, leader nodes are essential to the operation of distributed data services. It may accordingly be desirable that customers be provided control over the selection of leader nodes in distributed data services. The manner in which a user/customer is provided such control over selection of leader nodes in distributed data services according to several aspects of the present disclosure is described below with examples.

3. Selection of Leader Nodes in Distributed Data Services

Figure 2:
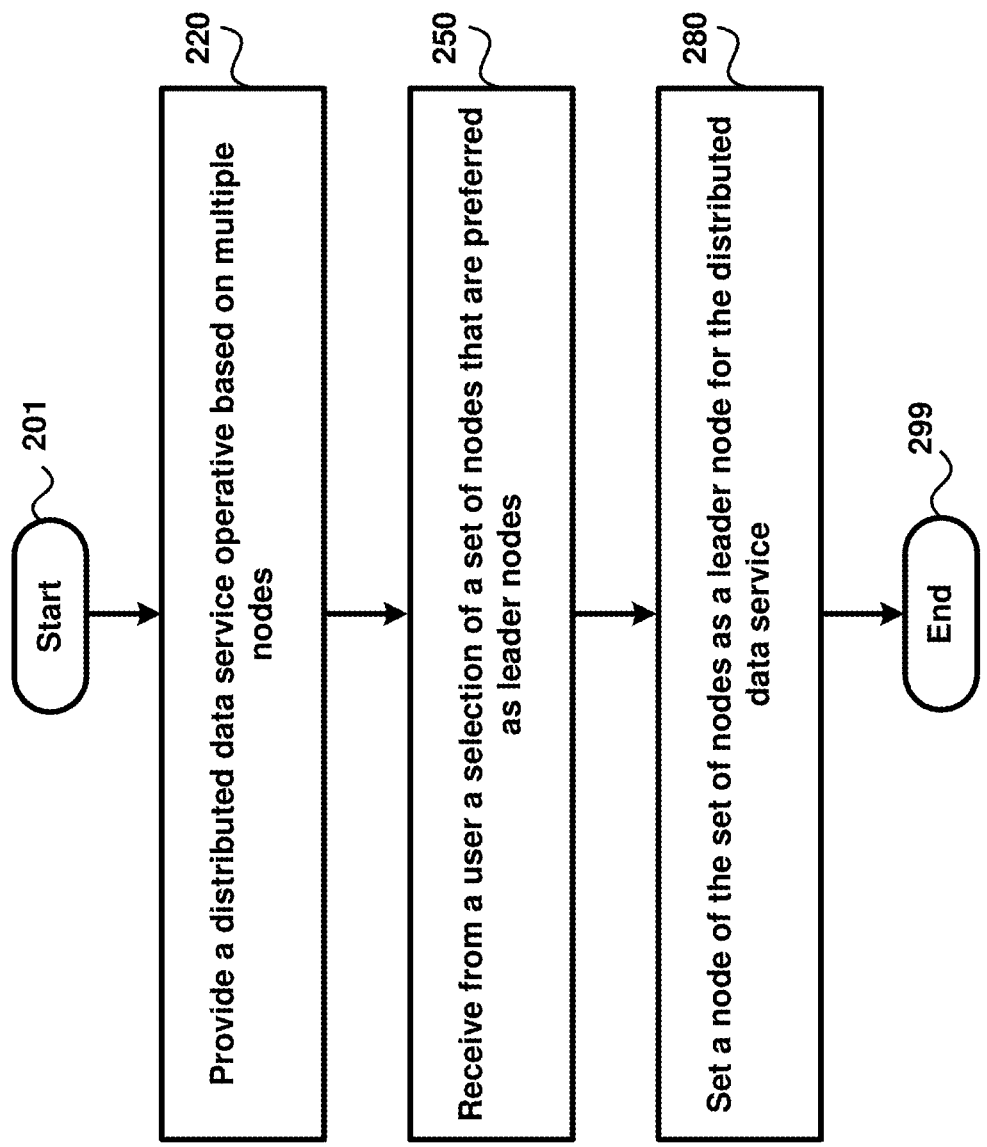
FIG. 2 is a flowchart illustrating the manner in which a user is provided control over the selection of leader nodes in distributed data services according to an aspect of the present disclosure.

FIG. 2 is a flowchart illustrating the manner in which a user is provided control over the selection of leader nodes in distributed data services according to an aspect of the present disclosure. The flowchart is described with respect to the systems of FIG. 1, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, a distributed data service is provided operative based on multiple nodes (for example, nodes of cloud infrastructures 110 and 120). The orchestration of the distributed data service may be performed by orchestration server 150 in response to receiving an input data from a user/customer (using end user system 160) requesting the provisioning of the distributed data service.

In step 250, a selection of a set of nodes that are preferred as leader nodes is received from a user. The selection may be received by orchestration server 150 and sent by a user/customer using end user system 160. In one embodiment, the selection is received as part of the input data requesting provisioning of the distributed data service.

In step 280, a specific node of the set of nodes is set as a leader node (for a cluster of nodes) in the distributed data service. Different nodes in the selected set of nodes may be set as leader nodes in corresponding clusters implementing the different parts of the distributed data service. The setting of the specific node as the leader node may be performed by orchestration server 150 (for example, as part of orchestration of provisioning of the distributed data service) and may entail sending the appropriate commands to the nodes of the universe to cause the specific node to be the leader node. The flowchart ends in step 299.

Thus, a user/customer is provided control over the selection of leader nodes for distributed data services. In the following description, several features of the present disclosure are described as being provided by orchestration server 150 for illustration. However, in alternative embodiments, the features of the present disclosure may be provided by any digital system (such as end user system 160, provisioning system 140A, etc.) having access to the universe of nodes, as will be apparent to one skilled in the arts by reading the disclosure herein.

The manner in which orchestration server 150 provides control over the selection of leader nodes for an example distributed data service according to the operation of FIG. 2 is illustrated below with examples.

4. Example Distributed Data Service

In the following sections, several aspects of the present disclosure are illustrated with respect to a distributed database as an example of a distributed data service. However the features of the present disclosure may be implemented with respect to other distributed data services (e.g., file server, replicated databases) as well, as will be apparent to one skilled in the relevant arts by reading the disclosure herein.

A distributed database is often implemented based on multiple nodes that cooperatively provide a unified view of database interfaces, while shielding the users from the underlying storage and processing of data. Distributed databases thus provide for fault tolerance (of nodes or storage), enhanced performance, data redundancy (by a replication factor), etc., as is well known in the relevant arts.

Figure 3A:
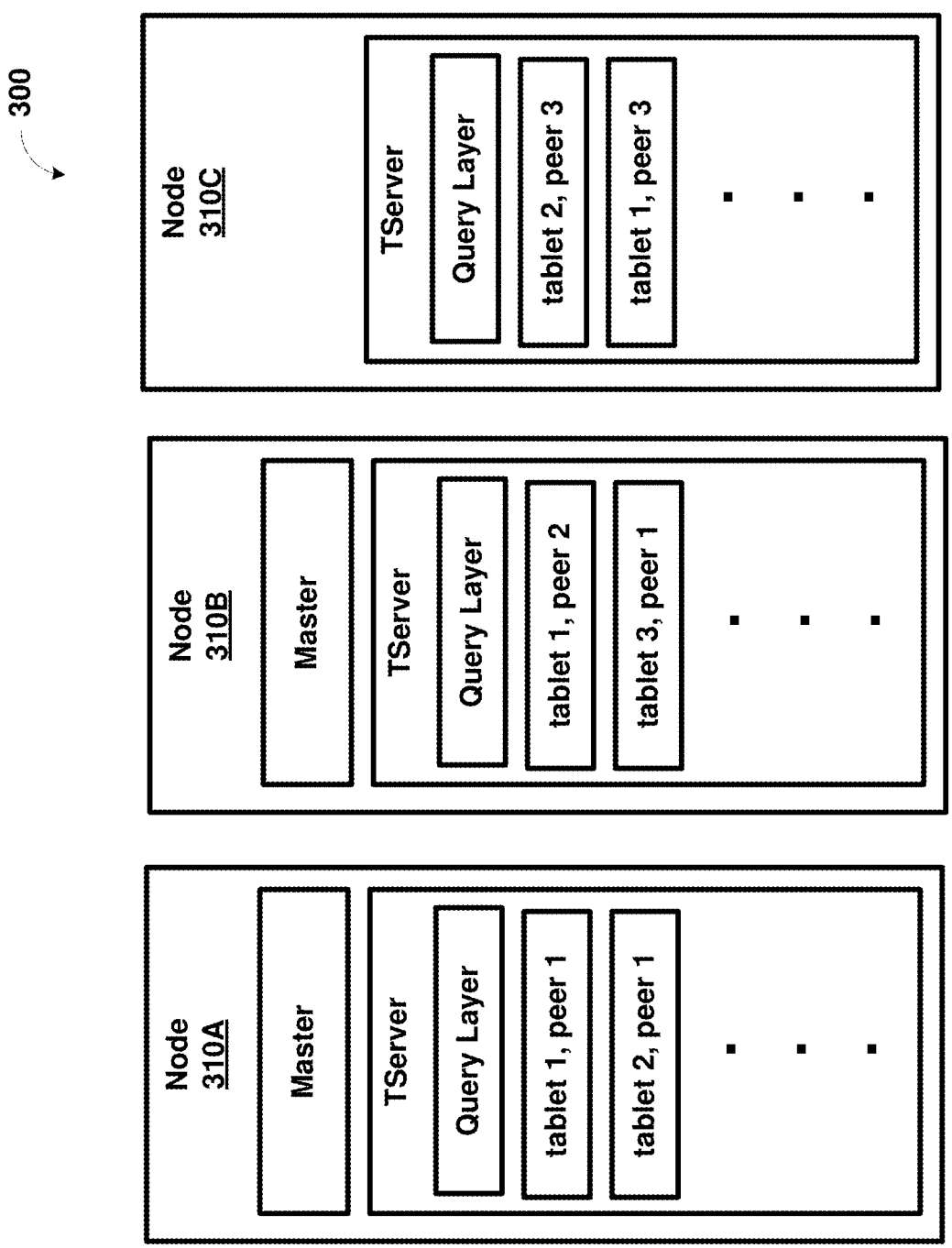
FIG. 3A depicts the internal details of a distributed database (example distributed data service) in one embodiment.

FIG. 3A depicts the internal details of a distributed database (example distributed data service) in one embodiment. Distributed database 300 is a group of nodes (referred to as a "universe") such as VMs, physical machines or containers that collectively function as a highly available and resilient distributed database. For illustration, the universe of distributed database 300 is shown containing three nodes 310A-310C, though in alternative embodiments, distributed databases contain fewer or more nodes depending on the purpose for which the database is designed.

Distributed database 300 is a system-of-record/authoritative database that geo-distributed applications can rely on for correctness and availability. Distributed database 300 allows applications to easily scale up and scale down across multiple regions in the public cloud, on-premises data centers or across hybrid environments without creating operational complexity or increasing the risk of outages.

Distributed database 300 may be deployed in a variety of configurations depending on business requirements, and latency considerations. Some examples are single availability zone (zone/rack/failure domain), multiple availability zones in a region, multiple regions (with synchronous and asynchronous replication choices), etc. An example of such a distributed database is YugaByte DB available from YugaByte, Inc. The components of distributed database 300 are described in detail below.

In one embodiment, the universe of distributed database 300 consists of one or more keyspaces, with each keyspace being a namespace that can contain one or more database tables. Each database table is split/sharded into one or more tablets (shards) based on non-overlapping groups of primary keys. Read/write operations are processed by converting the primary key into an internal key (and a corresponding hash value) and determining the specific tablet the operation should be routed to based on the internal key/hash value.

Distributed database 300 automatically shards, replicates and load-balances these database tables across the nodes in the universe, while respecting user-intent such as cross-AZ or region placement requirements, desired replication factor, and so on. Distributed database 300 automatically handles failures (e.g., node, availability zone or region failures), and re-distributes and re-replicates data back to desired levels across the remaining available nodes while still respecting any data placement requirements.

Distributed database 300 is shown to have two components—Master Server (Master) process and Tablet Server (TServer) process. The Master processes are responsible for keeping system metadata/records, such as what tables exist in the system, where their tablets live, what users/roles exist, the permissions associated with them, etc. Master processes also are responsible for coordinating system-wide operations such as create/alter/drop tables and initiating maintenance operations such as load-balancing or initiating re-replication of under-replicated data. The Master process' executing in the different nodes (310A-310B) are not in the critical path of IO against user tables (which is handled by TServer processes as described below).

The TServer processes are responsible for hosting/serving user data (e.g., database tables). Each TServer process does the actual IO for end user requests received from user applications. The user requests may be according to the various protocols supported by distributed database 300. Query Layer, executing as part of each TServer process, implements the server-side of multiple protocols/APIs that distributed database 300 supports such as Apache Cassandra CQL, Redis APIs, SQL API, etc.

As noted above, database tables are maintained as one or more tablets. Each tablet is replicated on several nodes, as per the replication factor of the respective table. For a given tablet, the nodes that serve these replicas are called tablet-peers with each TServer process hosting one or more tablet-peers. The manner in which a table having one or more tablets with a replication factor of 3 (that is, 3 peers) may be maintained in nodes 310A-310C is depicted in FIG. 3A.

Each TServer process also coordinates operations across tablets hosted by it by using techniques such as server-global block cache (leading to highly efficient memory utilization in cases when one tablet is read more often than others), throttled compactions (to prevent high foreground latencies during a compaction storm), small/large compaction queues to keep the system functional even in extreme IO patterns, server-global memstore limits, auto-sizing of block cache/memstore, striping tablet load uniformly across data disks, etc.

It may be appreciated that the Master and TServer processes are required to use a distributed consensus algorithm for operating in a distributed manner. An example consensus algorithm that may be used by the Master and TServer processes is described below with examples.

5. Example Consensus Algorithm

In one embodiment, the Master and TServer processes use Raft, a distributed consensus algorithm, for replicating changes to system metadata or user data respectively across a set of nodes. The detail of the Raft consensus algorithm is available in the paper entitled "In Search of an Understandable Consensus Algorithm (Extended Version)" by Diego Ongaro and John Ousterhout of Stanford University. Specifically, the Master process' executing in the different nodes (310A-310B) forms a Raft group with its peers, while the tablet-peers (e.g. "tablet 1, peer 1", "tablet 1, peer 2", etc.) corresponding to each tablet (e.g. "tablet 1") hosted on different TServers (in nodes 310A-310C) form a corresponding Raft group and replicate data between each other. Broadly, the Raft algorithm operates to elect a "leader" in each Raft group, with the other members in the Raft group being referred to as followers.

The nodes hosting each Raft group may be viewed as a corresponding cluster of nodes that implement a respective part (Master or TServer) of the distributed data service. For a given Raft group hosted by a cluster of nodes, the node hosting the "leader" elected for the Raft group is referred to as the leader node for the cluster. It should be noted that a leader node for a given Raft group may host the follower peers of other Raft groups as well. Furthermore, as a distributed database typically has multiple Raft groups, the distributed database has multiple leader nodes corresponding to the nodes hosting the leaders of the multiple Raft groups. Some example Raft groups and their operation is described below with examples.

Figure 3B:
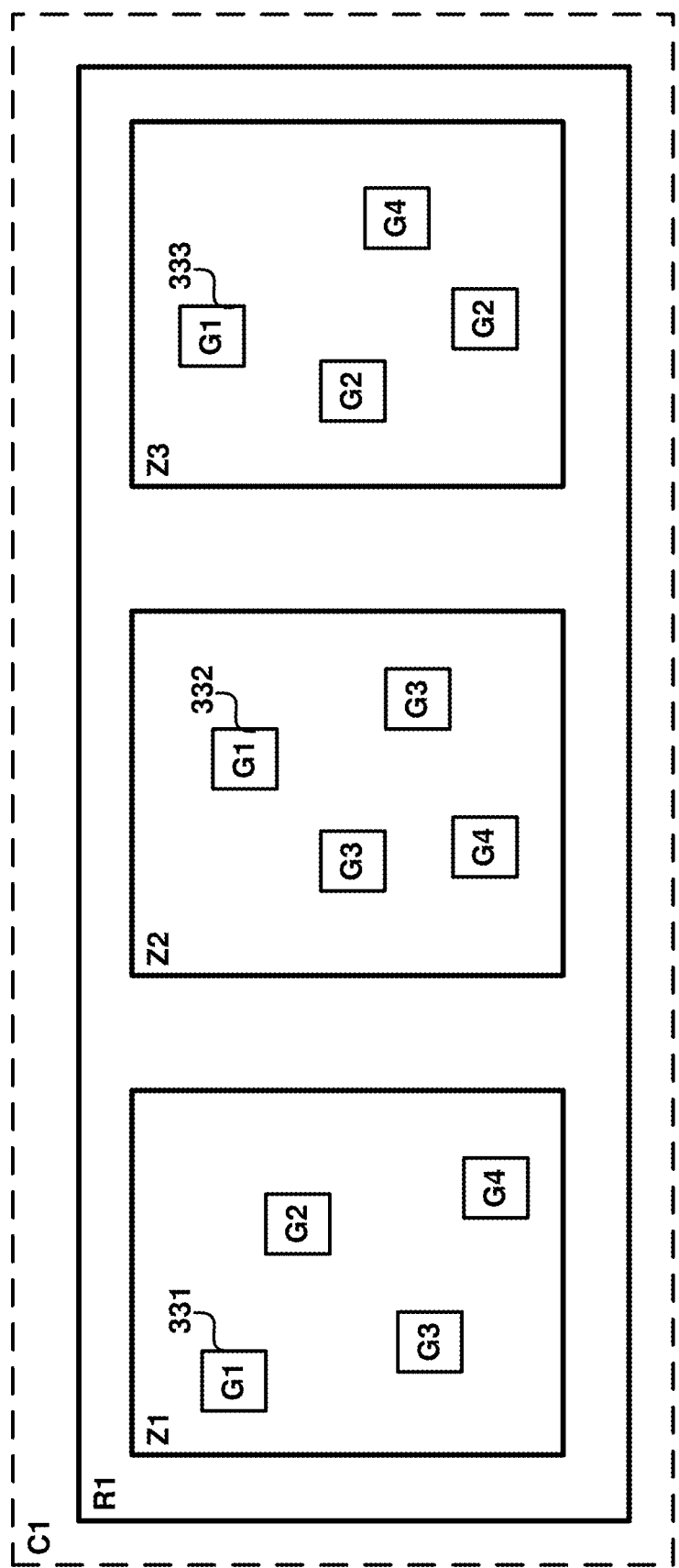
FIG. 3B depicts the various Raft groups that may be present in a distributed database (example distributed data service) in one embodiment.

FIG. 3B depicts the various Raft groups that may be present in a distributed database (example distributed data service) in one embodiment. For illustration, only a sample set of groups of distributed database 300 present in a single cloud infrastructure is shown in the Figure. However, the features of the present disclosure can be implemented for group spanning multiple availability zones and/or regions and/or cloud infrastructures, as will be apparent to one skilled in the relevant arts by reading the disclosure herein.

Specifically, four groups labeled G1, G2, G3 and G4 are shown in FIG. 3B with the corresponding group members (331-333) for group G1 shown distributed among various nodes (shown as squares) of three availability zones Z1, Z2 and Z3 within a specific geographical region R2 in cloud infrastructure C1. The group members shown in a single availability zone (e.g. Z1) may reside on the same node or be distributed among multiple nodes.

Each of groups G1 to G4 may represent either one of a master process group or a tablet-peers group (for either the Master or TServer data). In the following description, it is assumed that group G1 corresponds to "tablet 1" Raft group in TServer processes, with the members 331-333 respectively representing "tablet 1, peer 1", "tablet 1, peer 2", and "tablet 1, peer 3" respectively, while group G2 corresponds to a Raft group containing the master processes (shown in nodes 310A and 310B). High Availability (HA) of the Master process's functionalities and of the user-tables served by the TServers processes is achieved by the failure-detection and new-leader election mechanisms that are built into the Raft implementation.

As noted above, each Raft group elects a leader (and correspondingly a leader node) that is primarily in charge of handling react/write (access) requests received from external applications/systems (not shown). The (elected) leader of the Master processes (in group G2) has the additional responsibility to do a variety of background administrative tasks (such as load-balancing, re-replicating under-replicated tablets, keeping track of the last known tablet leader, etc.). The master leader constantly looks out for changes to the database universe, and initiates the necessary transformations required (changing a pre-defined number of tablets at the same time) so that the entire universe moves to the desired state in a throttled manner without any noticeable external interruption. In one embodiment, an external application first checks with master leader to determine a tablet leader for a desired access and then directly sends requests to the tablet leader for performing the desired access, thereby reducing access latency.

The (elected) leader node of TServer Raft groups such as G1 is responsible for executing the requests received from user applications/systems. The requests are first received by Query Layer (shown in each of nodes 310A-310C) which in turn examines the request to identify the specific tablet/shard (assumed to be "tablet 1" having Raft group G1) where the read/write is to be performed. Query Layer then forwards the request to the leader node (assumed to be 332) for that specific tablet.

Leader node 332 for the tablet (group G1) upon receiving a write request, performs the write operation indicated in the write request on its copy of data ("tablet 1, peer 2") while obtaining the necessary locks, initiates replication of the data to its peers (331 and 333) and sends a response to the write request. Leader node 332 upon receiving a read request, performs the read operation indicated in the read request on its copy of data and sends a response to the read request (with the results of the read operation). The Master and TServer processes along with the operation of Raft groups provides for a transactional, high performance distributed database (300) for planet-scale applications.

An aspect of the present disclosure facilitates a user/customer to select leader nodes for distributed database 300. According to another aspect, the selection of the leader nodes is performed as part of provisioning of distributed database 300 by orchestration server 150. Accordingly, the manner in which orchestration server 150 provisions distributed database 300 is described below with examples.

6. Orchestrating the Provisioning of a Distributed Database

Figure 4A:
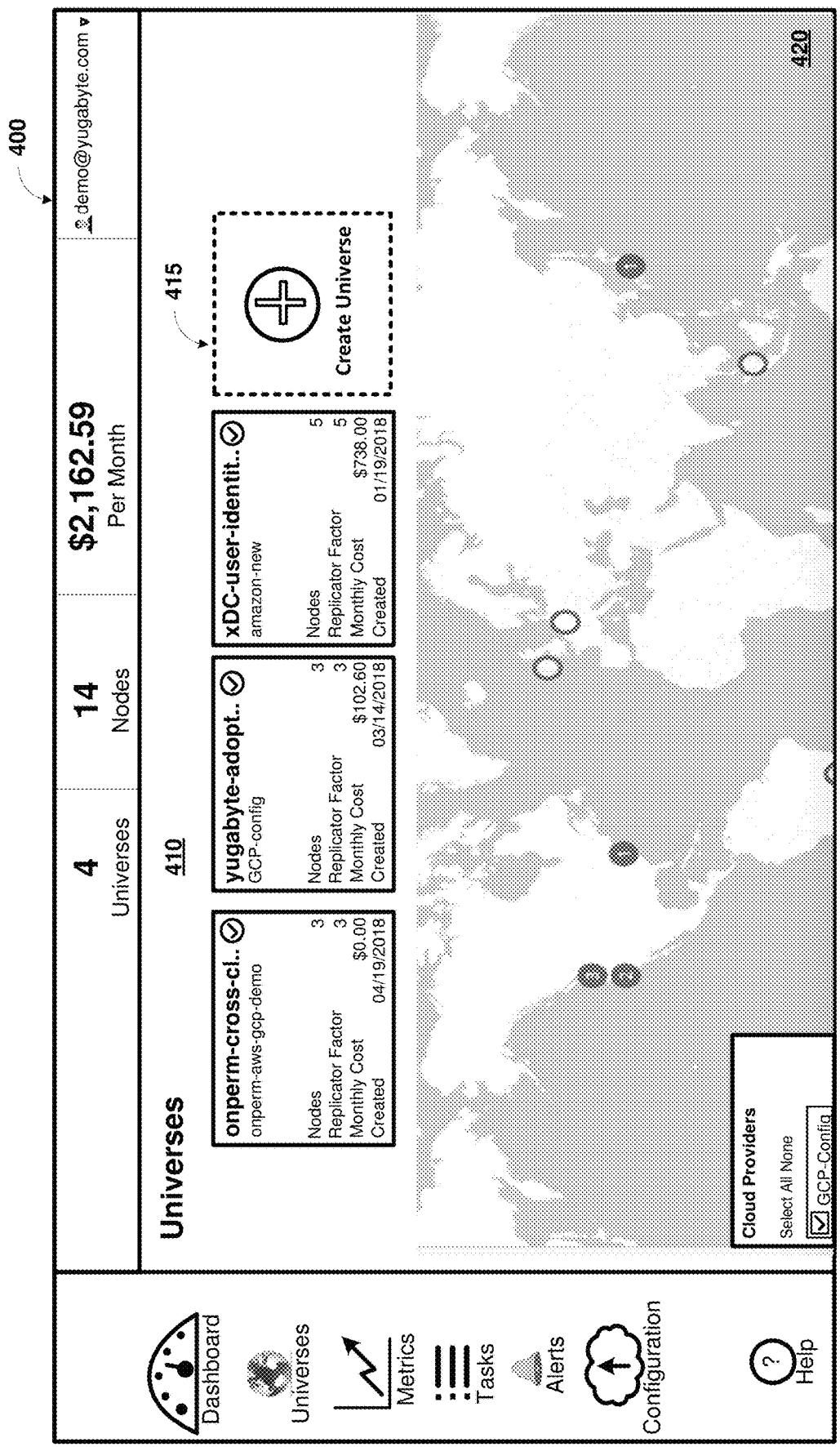

FIGS. 4A and 4B depicts sample user interfaces provided for provisioning/creation of a distributed database (example distributed data service) in one embodiment. Display areas 400 and 430 represent a respective portion of a user interface displayed on a display unit (not shown) associated with end user system 160. In one embodiment, display area 400/430/470 corresponds to a web page rendered by a browser executing on end user system 160. Web pages are provided by orchestration server 150 in response to a user sending appropriate requests (for example, by specifying corresponding URLs in the address bar) using the browser.

Referring to FIG. 4A, display area 400 depicts a "Dashboard" web page that is displayed in the browser (executing in end user system 160) in response to a user/customer specifying a URL in the browser address bar. Display area 410 depicts the various distributed database universes (clusters) that have been previously been provisioned by the customer. Display area 420 depicts the universes graphically on a world map, with each circle indicating a corresponding region and the number within the circle indicating the corresponding number of zones in which nodes have been provisioned for the customer. The user/customer may click/select display area 415 to indicate creation of a new universe (distributed database).

Referring to FIG. 4B, display area 330 depicts a "Create Universe" web page that is displayed in the browser in response to the user/customer clicking/selecting display area 415 in FIG. 4A. Display area 440 facilitates the user/customer to specify a name for the universe (e.g. "xdc-read-replicas"), the specific provider (e.g. "GCP-config"), the specific regions (e.g. "GCP-Oregon"), the number of nodes (e.g. 3) and the replication factor (e.g. 3).

It may be appreciated that the user/customer may select any desired number and/or combination of desired providers and/or regions and/or nodes in the interface of display area 440. For example, to create a universe in AWS, the user may specify the provider as "AWS-new" and the specific region(s) as "AWS-Oregon".

In response to the user/customer specifying the details in display area 440, orchestration server 150 determines the availability zones in the regions selected in display area 440 and the distribution of the customer specified nodes among the zones and displays the corresponding information in display area 450. In display area 450, the "Preferred" check box has been shown selected for all of the zones gcp-us-west1-a, gcp-us-west1-b, and gcp-us-west1-c indicating that all the three zones are preferred (in other words, there is no specific zone that is more preferred than the others) for the leader nodes.

The user/customer may then specify the desired node distribution (1 node in each zone) among the different zones shown in display area 450 and also the details of the instance to be provisioned (e.g. "n-standard-1") on the nodes in display area 455. The user/customer may also specify one or more advanced options (not shown for conciseness) in display area 460. After specifying the desired details, the user/customer may click/select "Create" button 490 to indicate the creation of the specified universe.

In one embodiment, the user/customer clicks/selects "Configure Read Replica" button 465 to configure the read replication details. The read replica is a cluster of nodes that maintains a read-only copy of the data in an asynchronous manner from the nodes in the primary cluster (shown in FIG. 3A). Such a read replica may be desirable when the latency of doing a distributed consensus based write among the nodes in the primary cluster is not tolerable for some workloads.

In response to the user/customer selecting button 490 in FIG. 4B, orchestration server 150 then performs one or more underlying tasks for creating the customer specified universe/distributed database such as provisioning the nodes, configuring the nodes, initiating the Master processes on the nodes, waiting for the Master processes to be alive, initiating the TServer processes on the nodes, and waiting for the TServer processes to be alive. Orchestration server 150 performs the tasks noted above by sending appropriate commands to provisioning systems 140A-140C.

According to an aspect of the present disclosure, orchestration server 150 provides hints to distributed database 300 on the preferred regions/zones of the cloud infrastructure in which leader nodes (in charge of handling reads/writes from user applications) are to be elected as described below with examples.

7. Providing Hints for Leader Nodes

It may be appreciated that such hints are useful in situations where the requests (from the user applications) to the distributed data service are known to be originating from a particular geographical location, and it is desirable to optimize for read/write latencies by avoiding unnecessary network overheads. For example, in distributed database 300 of FIGS. 3A and 3B, it may be appreciated that a node receiving a single read/write request may be required to serialize and/or de-serialize the request and send it over a network to one or more nodes hosting the leaders (of the different Raft groups/tablets).

Accordingly, when the user requests are known to originate in a specific availability zone (e.g. Z1), it may be desirable that all the leaders (nodes) of the different tablet Raft groups be in the same zone. By having the leader (nodes) in the same availability zone (e.g. Z1), the network overheads may be reduced. In addition, in the scenario that the leader is hosted on the same node as the Query Layer receiving the request from the user application, the request may be forwarded as a procedure call, thereby eliminating network overhead. In one embodiment described in detail below, a customer preference data indicating the preferred regions/zones for leader nodes is received from a user/customer during creation of the distributed database.

Figure 5A:
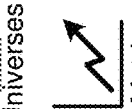

FIGS. 5A-5B depict sample user interfaces provided for specifying customer preference data indicating the preferred regions/zones for leader nodes during creation of distributed databases in one embodiment. Display area 500 of FIGS. 5A and 5B are similar to display area 430 of FIG. 4B and accordingly the description of the various user interface elements shown is not repeated here for conciseness. In particular, display area 520 of FIG. 5A and display area 540 of FIG. 5B are similar to display area 450 of FIG. 4B and facilitates the user/customer to specify customer preference data indicating the preferred regions/zones for leader nodes.

Referring to FIG. 5A, display area 520 indicates that the user has selected the "Preferred" check box only for the zone "gcp-us-west1-b" to indicate that only zone "gcp-us-west1-b" is preferred for the leader nodes. In other words, whenever a leader is elected for a Raft group (whether for master process or tablet-peers), the node hosting the elected leader is required to be one of the nodes in the preferred zone "gcp-us-west1-b". Referring to FIG. 5B, display area 540 indicates that the user has selected only one preferred zone "gcp-us-west1-b", and in addition has changed the number of nodes in the preferred zone to 2 (instead of 1 as shown in display area 520). It may be observed that in response to the user having selected only two zones for the three nodes, orchestration server 150 displays a message to indicate that the data placement is not geo-redundant and that the distributed database universe cannot survive an availability zone failure.

In response to the customer preference data, orchestration server 150 provides hints on the preferred regions/zones in which leader nodes are to be elected during operation of distributed database 300 as described in detail below. For example, in response to the customer preference data of display area 710, orchestration server 150 may send a hint to the nodes (310A-310C) in distributed database 300 that zone Z1 corresponding to "gcp-us-west1-b" is the preferred zone for leader nodes.

When such a hint is specified, to the extent possible (i.e., when there are nodes available in the preferred region), distributed database 300 keeps the leader nodes for the various shards of data in that "preferred" location and balanced within the available nodes in that location as described in detail below. This ensures that in steady-state, the user applications using the distributed database see low-latencies for their read/write operations.

In one embodiment, one of the administrative tasks performed by the leader master (noted above with respect to FIG. 3B) is to move the Raft group tablet leaders around to desired locations/nodes for enforcing any preferred availability zones/region hints sent by orchestration server 150. In one embodiment, the Raft consensus algorithm is extended to enable external agents (such as leader master) to ask the Raft group to switch leaders. For example, the Raft group G1 having members 331-333 and leader as 332 can be asked to switch its leader to 331 in response to receiving (or having received) a hint from orchestration server 150 that Z1 is the preferred zone (and 331 is in Z1).

In particular, leader master sends a request to leader 332 to instruct leader 332 to step down and indicating that member 331 should be the new leader. Member 332 accordingly steps down as leader and sends a request to member 331 to start an election immediately to be the new leader. Such an operation gives member 331 an edge over other members (of the group) to win the election because the rest of the members (333) would not start an election before they have missed enough heartbeats from member 331. In addition, the rest of the members (333) may be required to wait for an additional arbitrary time to avoid collision. However, if member 331 hasn't caught up in the replication to be a legitimate leader or it has lost in a recent election, leader 332 will notify the leader master and won't step down. Such a feature acts as a precaution to keep the quorum (group) stable and minimize the time of it without a leader. Member 331 may after some time again request the leader 332 to step down, which are processed by the member nodes as noted above. Such step-down request may be issued iteratively until member 331 is elected as the leader node for group G1.

It may thus be appreciated that the above noted approach of leader node selection is compatible with the Raft consensus algorithm (as desired in several environments) and yet the desired selection is obtained merely by modifying operation of a member node in the Raft group.

Thus, a user/customer is facilitated to specify a customer preference data indicating the preferred regions/zones for leader nodes during creation of the distributed database (300) with orchestration server 150 then generating and providing appropriate hints during operation of the distributed database (300).

It may be appreciated that the display area 520/540 may be used to specify the initial preferred zones/regions, and may be modified dynamically at a later time (by editing the universe). For example, the distributed database may be stopped while executing with region1 and zone1 as the preferred region/zone, and later after migration to another region/zone may be executed with the preferred region and zone set respectively to region2 and zone2. The manner in which a user/customer is facilitated to modify the leader nodes during operation of the distributed data service is described below with examples.

8. Changing Leader Nodes During Operation of a Distributed Database

Figure 6A:
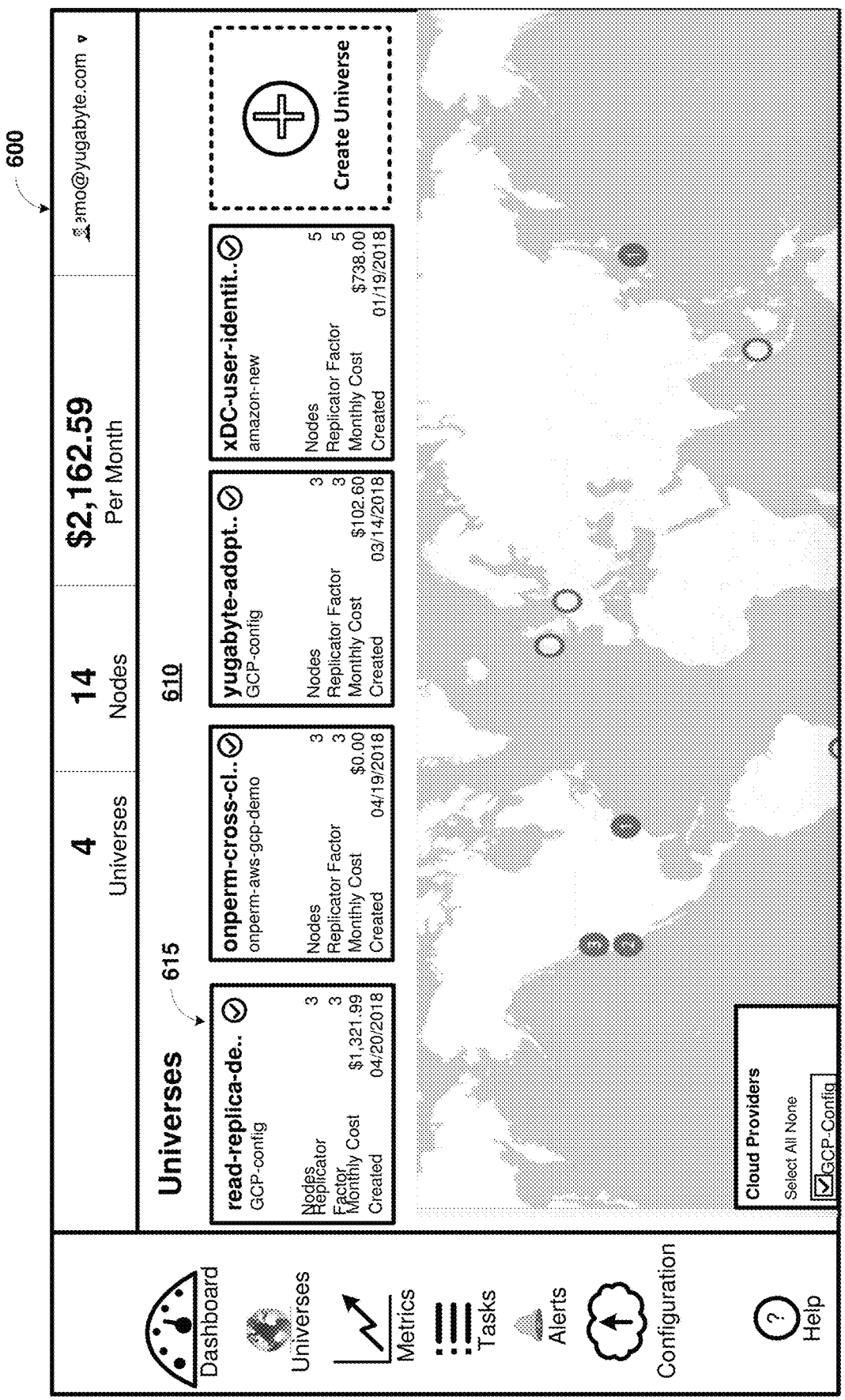
Figure 6B:
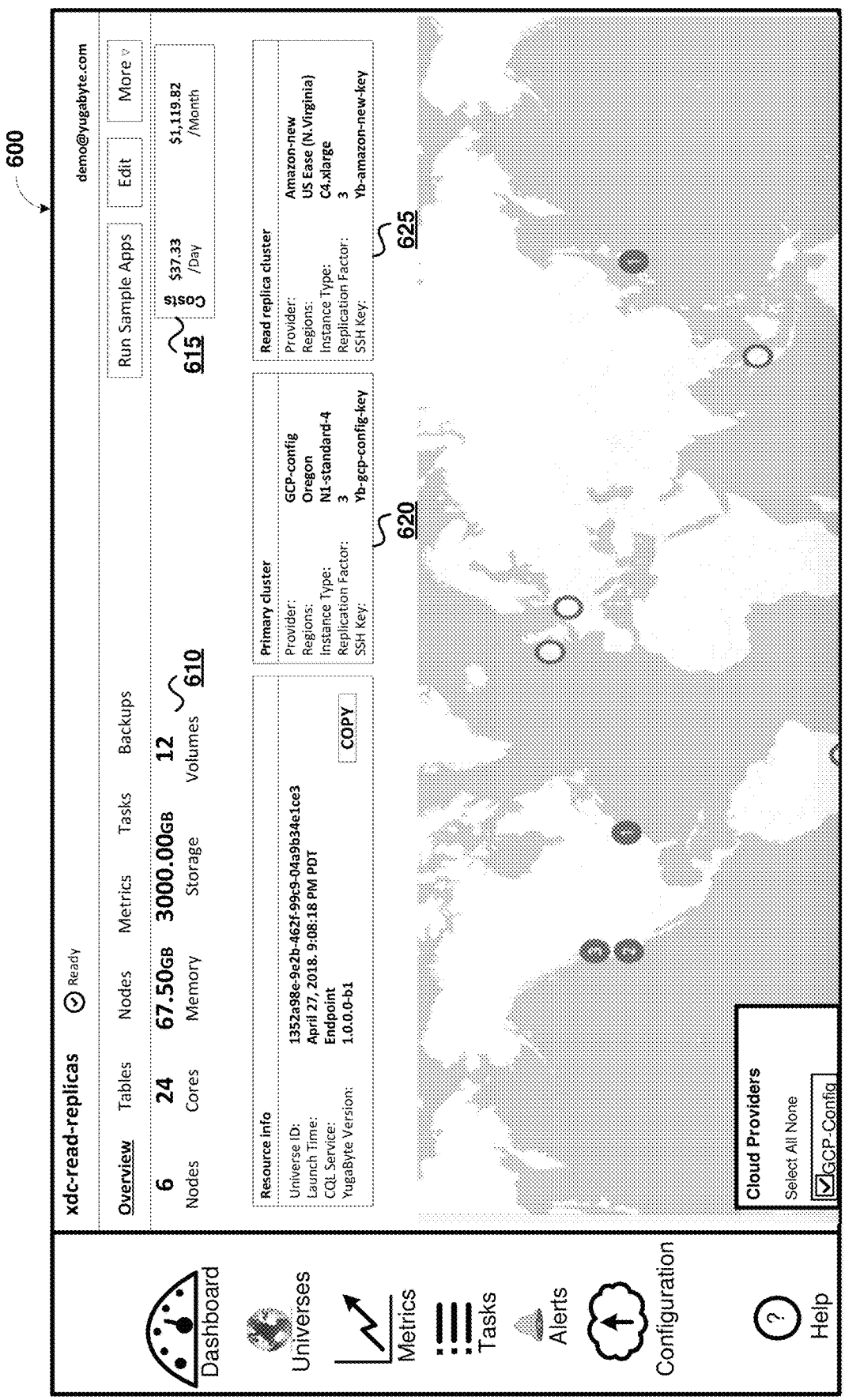

FIGS. 6A-6C depicts sample user interfaces provided for monitoring the operation of a provisioned distributed database (example distributed data service) in one embodiment. Display area 600 represents a portion of a user interface displayed on a display unit (not shown) associated with end user system 160. In one embodiment, display area 600 corresponds to a web page rendered by a browser executing on end user system 160. Web pages are provided by orchestration server 150 in response to a user sending appropriate requests (for example, by specifying corresponding URLs in the address bar) using the browser.

Display area 600 of FIG. 6A, similar to display area 400 of FIG. 4A, displays a "Dashboard" page but with the newly created universe "xdc-read-replicas" (created using the interfaces of FIGS. 4A-4B) shown in display area 610. The user/customer may then click/select display area 615 to view the details of the newly created universe.

Display area 600 of FIG. 6B accordingly depicts an "Overview" web page that is displayed in the browser (executing in end user system 160) in response to a user/customer selecting the universe named "xdc-read-replicas" by clicking/selecting display area 615 of FIG. 6A. Display area 610 depicts the details of the provisioned nodes such as the number of nodes, the number of CPUs, the total storage, etc., while display area 615 depicts the details of the cost of the provisioned nodes. Display area 620 depicts the details of the primary cluster such as the specific cloud provider (GCP), the region and the zone to which the nodes belong, while display area 625 depict the corresponding details of the read replica cluster.

Display area 600 of FIG. 6C depicts the "Nodes" web page that is displayed in the browser in response to a user/customer selecting the tab "Nodes" in FIG. 6B. Display area 640 specifies the details of the nodes that are provisioned as part of the universe. In particular, display area 640 depicts respective tables of nodes allocated to the primary cluster and the read replica during provisioning/creation of distributed database 300. It may be readily observed that row 650 indicates the current master leader node for the primary cluster.

An aspect of the present disclosure facilitates a user/customer to specify a preferred leader node among the nodes in the primary cluster. For example, the "ACTIONS" drop down in the last column of the table may include an option to indicate that another node is the preferred leader node. In response to the user/customer specifying such an action against a specific node (e.g. node with IP address "10.150.0.37"), orchestration server 150 sends hints to distributed database 300 to cause the specific node to be made the leader node.

Thus, a user/customer is facilitated to monitor the operation of a previously provisioned distributed database and to change the leader nodes during the operation of the distributed database (example distributed data service). The manner in which orchestration server 150 is implemented in one embodiment is described below with examples.

9. Orchestration Server

According to an aspect of the present disclosure, orchestration server 150 provides an infrastructure independent control plane for orchestration of distributed data services such as distributed databases in multiple cloud infrastructures. In one embodiment, an admin console application (described below) executing in orchestration server 150 provides the control plane for installing, managing and orchestrating several aspects of the distributed databases. An example of such an admin console application is the YugaWare application available from YugaByte, Inc.

Figure 7:
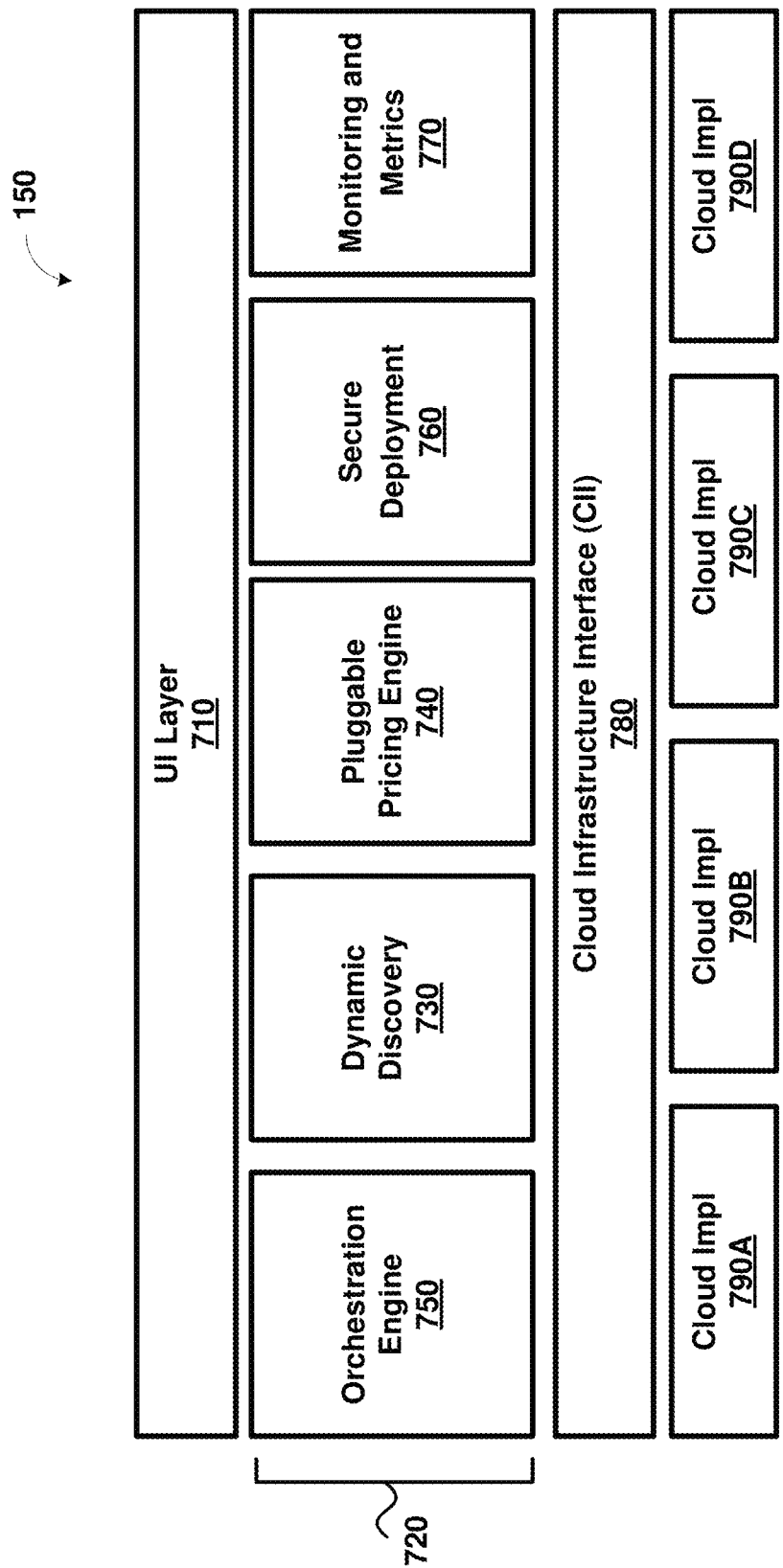
FIG. 7 is a block diagram illustrating an example implementation of an infrastructure independent control plane (admin console application) provided in an orchestration server in one embodiment.

FIG. 7 is a block diagram illustrating an example implementation of an infrastructure independent control plane (admin console application) provided in an orchestration server in one embodiment. The block diagram is shown containing user interface (UI) layer 710, application programming interface (API) layer 720, cloud infrastructure interface (CII) 780 and cloud implementations 790A-290D. API layer 720 in turn is shown containing orchestration engine 750, dynamic discovery 730, pluggable pricing engine 740, secure deployment 760, monitoring and metrics 770.

Merely for illustration, only representative number/type of blocks is shown in the FIG. 7. In addition, the blocks are shown executing in orchestration server 150. Many environments often contain many more blocks, both in number and type, with some of the blocks executing in other systems/servers, depending on the purpose for which the environment is designed. Each block of FIG. 7 is described below in further detail.

UI layer 710 receives user requests from (users/customers using) end user system 160 and sends appropriate web pages as corresponding responses to the user requests. UI layer 710 also receives inputs provided by the users in the provided web pages and invokes the corresponding modules in API layer 720. In one embodiment, UI layer 710 is implemented using React JS.

API layer 720 contains one or more modules implementing corresponding functionalities provided by the control plane. For example, orchestration engine 750 facilitates the orchestration of a distributed database spanning diverse cloud infrastructures. Dynamic discovery 730 facilitates discovery of new nodes based on configuration such that the provisioning of an application/service can be modified without affecting other applications/services. Pluggable pricing engine 740 facilitates users/customers to view the approximate costs of provisioning of a distributed database including what-if scenarios.

Secure deployment 760 facilitates the secured provisioning/deployment of the distributed databases including features such as network isolation, encryption, access control, etc. Monitoring and metrics 770 facilitates users/customers to monitor various metrics such as CPU usage, memory usage, requests processed, etc. associated with the virtual/physical nodes on which a distributed database has been provisioned. In one embodiment, the modules of API layer 720 are implemented in Java™ programming language.

In one embodiment, the admin console application makes orchestration tasks intent based, and greatly simplifies operational complexity. These intents can be specified via UI layer 710. In other words, the user/customer using UI layer 710 specifies the intent of the orchestration, with the modules in API layer 720 then performing various underlying tasks associated with the intent without requiring the user/customer to either specify or be aware of the underlying tasks.

Examples of such intents covering the entire life-cycle of a distributed database include, but are not limited to, creation of a distributed database (described above), expanding/shrinking the distributed database based on demand, deploy data across fault domains (multi-zone, multi-region, multi-cloud configurations), zero downtime database software upgrade, zero downtime migrations of a deployment: from one hardware type to another; from one cloud provider to another, stretching a deployment from one cloud to another cloud.

In an embodiment, the implementations of each of such intents are invocable by corresponding calls of an API, e.g., via a REST API. Such a feature can be the basis for implementing automation of various tasks associated with distributed databases. For example, an automated script can be implemented by appropriate calls to the API to expand the number of nodes in the database universe during expected peak usage durations and to shrink (reduce the number of nodes in) the database universe during non-peak usage durations.

CII 780 provides a cloud agnostic interface to the modules in API layer 720, such that the modules are facilitated to be implemented without having any cloud specific details. Each of cloud implementations 790A-790D represents a corresponding module that is specific to a cloud infrastructure such as AWS, GCP, On-Premises, etc. CII 780 in association with cloud implementations 790A-790D together operate to convert high-level tasks invoked from API layer 720 to the corresponding actual set of commands specific to the cloud infrastructure, as will be apparent to one skilled in the relevant arts. The commands may be sent to one or more of provisioning systems 140A-140C, which in turn cause the commands to be executed in the corresponding cloud infrastructure (110 and 120). In one embodiment, CII 780 and cloud implementations 790A-790D (or portions thereof) are implemented in Python™ programming language.

Thus, orchestration server 150 implements an infrastructure independent control plane that facilitates several features of the present disclosure.

It should be appreciated that the features described above can be implemented in various embodiments as a desired combination of one or more of hardware, software, and firmware. The description is continued with respect to an embodiment in which various features are operative when the software instructions described above are executed.

10. Digital Processing System

Figure 8:
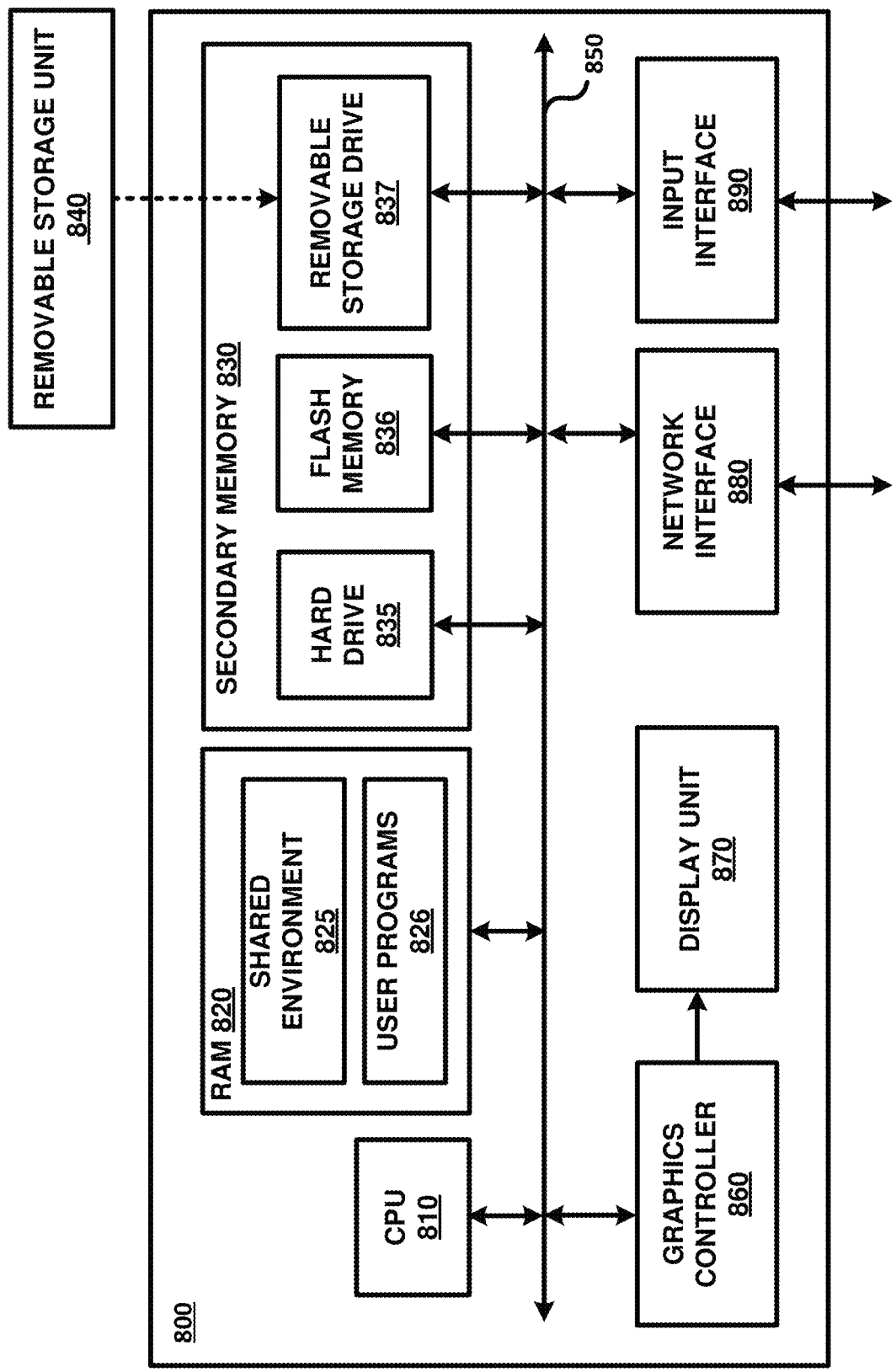
FIG. 8 is a block diagram illustrating the details of digital processing system 800 in which various aspects of the present disclosure are operative by execution of appropriate executable modules In the drawings, similar reference numbers generally indicate identical, functionally similar, and/or structurally similar elements. The drawing in which an element first appears is indicated by the leftmost digit(s) in the corresponding reference number.

FIG. 8 is a block diagram illustrating the details of digital processing system 800 in which various aspects of the present disclosure are operative by execution of appropriate executable modules. Digital processing system 800 may correspond to each of orchestration server 150 and end user system 160.

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or other user programs 826 (such as other applications, DBMS, etc.). In addition to shared environment 825, RAM 820 may contain other software programs such as device drivers, virtual machines, etc., which provide a (common) run time environment for execution of other/user programs.

Graphics controller 860 generates display signals (e.g., in RGB format) to display unit 870 based on data/instructions received from CPU 810. Display unit 870 contains a display screen to display the images defined by the display signals (for example, the portions of the user interfaces shown in FIGS. 4A-4B, 5A-5B and 6A-6C). Input interface 890 may correspond to a keyboard and a pointing device (e.g., touch-pad, mouse) and may be used to provide inputs (for example, the user inputs provided in the above noted user interfaces). Network interface 880 provides connectivity to a network (e.g., using Internet Protocol), and may be used to communicate with other systems (of FIG. 1) connected to the network (130).

Secondary memory 830 may contain hard drive 835, flash memory 836, and removable storage drive 837. Secondary memory 830 may store the data (for example, data/commands sent to provisioning systems 140A-140C) and software instructions (for example, for implementing the various features of the present disclosure, etc.), which enable digital processing system 800 to provide several features in accordance with the present disclosure. The code/instructions stored in secondary memory 830 may either be copied to RAM 820 prior to execution by CPU 810 for higher execution speeds, or may be directly executed by CPU 810.

Some or all of the data and instructions may be provided on removable storage unit 840, and the data and instructions may be read and provided by removable storage drive 837 to CPU 810. Removable storage unit 840 may be implemented using medium and storage format compatible with removable storage drive 837 such that removable storage drive 837 can read the data and instructions. Thus, removable storage unit 840 includes a computer readable (storage)

medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

11. Conclusion

While various embodiments of the present disclosure have been described above, it should be understood that they have been presented by way of example only, and not limitation. Thus, the breadth and scope of the present disclosure should not be limited by any of the above-described exemplary embodiments.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A method comprising:
   providing a distributed data service operative based on a plurality of nodes organized into a plurality of zones in a cloud infrastructure;
   receiving from a user a selection comprising indication of a first zone of said plurality of zones as being preferred for leader nodes, said first zone comprising a set of nodes of said plurality of nodes; and
   setting a first node of said set of nodes as a leader node in said distributed data service in view of said selection by said user.

2. The method of claim 1, further comprising:
   receiving from said user an input data requesting provisioning of said distributed data service; and
   orchestrating provisioning of said distributed data service on said plurality of nodes, wherein said orchestrating is performed in response to said receiving of said input data,
   wherein said selection is received as a part of said input data, and wherein said setting is performed as a part of said orchestrating.

3. The method of claim 2, wherein said plurality of nodes is grouped into a plurality of clusters of nodes, said method further comprising:
   electing a corresponding leader node for each cluster of said plurality of clusters of nodes, but setting one of said set of nodes as the leader node of a first cluster if the elected leader node for the first cluster is not organized into said first zone.

4. The method of claim 3, wherein said electing is performed by a consensus algorithm,
   wherein said setting comprises execution of said consensus algorithm iteratively until one of said set of nodes organized into said first zone is elected as the leader node of said first cluster in view of receiving of said selection.

5. The method of claim 4, wherein said consensus algorithm is Raft consensus algorithm.

6. The method of claim 5, wherein said distributed data service is a distributed database.

7. The method of claim 1, wherein said selection of said set of nodes includes only said first node.

8. A non-transitory machine readable medium storing one or more sequences of instructions, wherein execution of said one or more instructions by one or more processors contained in a system causes said system to perform the actions of:
   providing a distributed data service operative based on a plurality of nodes organized into a plurality of zones in a cloud infrastructure;
   receiving from a user a selection comprising indication of a first zone of said plurality of zones as being preferred for leader nodes, said first zone comprising a set of nodes of said plurality of nodes; and
   setting a first node of said set of nodes as a leader node in said distributed data service in view of said selection by said user.

9. The non-transitory machine readable medium of claim 8, further comprising one or more instructions for:
   receiving from said user an input data requesting provisioning of said distributed data service; and
   orchestrating provisioning of said distributed data service on said plurality of nodes, wherein said orchestrating is performed in response to said receiving of said input data, wherein said selection is received as a part of said input data, and wherein said setting is performed as a part of said orchestrating.

10. The non-transitory machine readable medium of claim 8, wherein said plurality of nodes are grouped into a plurality of clusters of nodes, further comprising one or more instructions for:

electing a corresponding leader node for each cluster of said plurality of clusters of nodes, but setting one of said set of nodes as the leader node of a first cluster if the elected leader node is not organized into said first zone.

11. The non-transitory machine readable medium of claim 10, wherein said electing is performed by a Raft consensus algorithm, wherein said setting comprises one or more instructions for execution of said consensus algorithm iteratively until one of said set of nodes organized into said first zone is elected as the leader node of said first cluster in view of receiving of said selection.

12. The non-transitory machine readable medium of claim 11, wherein said distributed data service is a distributed database.

13. A digital processing system comprising:
one or more processors; and
a random access memory (RAM) to store instructions, wherein said one or more processors retrieve said instructions and execute said instructions, wherein execution of said instructions causes said digital processing system to perform the actions of:
providing a distributed data service operative based on a plurality of nodes organized into a plurality of zones in a cloud infrastructure;
receiving from a user a selection comprising indication of a first zone of said plurality of zones as being preferred for leader nodes, said first zone comprising a set of nodes of said plurality of nodes that are preferred as leader nodes; and
setting a first node of said set of nodes as a leader node in said distributed data service in view of said selection by said user.

14. The digital processing system of claim 13, further performing the actions of:
receiving from said user an input data requesting provisioning of said distributed data service; and
orchestrating provisioning of said distributed data service on said plurality of nodes, wherein said orchestrating is performed in response to said receiving of said input data,
wherein said selection is received as a part of said input data, and wherein said setting is performed as a part of said orchestrating.

15. The digital processing system of claim 13, wherein said plurality of nodes are grouped into a plurality of clusters of nodes, said digital processing system further performing the actions of:
electing a corresponding leader node for each cluster of said plurality of groups of nodes, but setting one of said set of nodes as the leader node of a first cluster if the elected leader node is not organized into said first zone.

16. The digital processing system of claim 15, wherein said electing is performed by a Raft consensus algorithm,
wherein said setting comprises execution of said consensus algorithm iteratively until one of said set of nodes organized into said first zone is elected as the leader node of said first cluster in view of receiving of said selection.

17. The digital processing system of claim 16, wherein said distributed data service is a distributed database.

* * * * *